United States Patent [19]

Leffingwell

[11] Patent Number: 4,505,960
[45] Date of Patent: Mar. 19, 1985

[54] UNITARY SHOCK-ABSORBING POLYMERIC PAD FOR ARTIFICIAL TURF

[75] Inventor: James W. Leffingwell, Whitfield County, Ga.

[73] Assignee: Monsanto Company, St. Louis, Mo.

[21] Appl. No.: 522,872

[22] Filed: Aug. 12, 1983

[51] Int. Cl.³ .............................. B32B 7/02
[52] U.S. Cl. ...................... 428/17; 428/95; 428/215; 428/218
[58] Field of Search ............ 428/17, 95, 215, 218

[56] References Cited

U.S. PATENT DOCUMENTS

| | | | |
|---|---|---|---|
| 2,515,847 | 7/1950 | Winkler | 428/17 |
| 3,573,147 | 3/1971 | Elbert | 161/21 |
| 3,574,107 | 4/1971 | Hurka | 161/67 |
| 3,661,687 | 5/1972 | Spinney, Jr. et al. | 161/21 |
| 3,801,421 | 4/1974 | Allen et al. | 161/67 |
| 3,900,656 | 8/1975 | Schmidt | 428/17 |
| 3,975,562 | 8/1976 | Madebach et al. | 428/95 |
| 4,147,828 | 4/1979 | Heckel | 428/255 |
| 4,268,551 | 5/1981 | Moore, Jr. | 428/17 |

FOREIGN PATENT DOCUMENTS 844658  6/1970  Canada .................. 400/5

OTHER PUBLICATIONS

American Society for Testing and Materials (ASTM) Standard Specification D 1667-76.
American Society for Testing and Materials (ASTM) Standard Test Method F 355-78.

*Primary Examiner*—Marion E. McCamish
*Attorney, Agent, or Firm*—Thomas E. Kelley

[57] ABSTRACT

Unitary, shock-absorbing polymeric pads having a vertically asymmetric compression resistance which are useful for recreational surfaces, for instance under artificial turf.

15 Claims, No Drawings

UNITARY SHOCK-ABSORBING POLYMERIC PAD FOR ARTIFICIAL TURF

FIELD OF THE INVENTION

This invention relates to unitary shock-absorbing polymeric pads having vertically asymmetric compression resistance. These pads have a soft upper layer which provides comfort on contact and are useful for a variety of athletic and recreational purposes. They are particularly useful as a support layer for artificial turf.

DEFINITION OF TERMS

In the description of the present invention, the following definitions are used.

The symbol "G" as used in this patent application means the ratio of the magnitude of deceleration of a missile impacting a shock-absorbing pad relative to the acceleration of gravity. The term "maximum value of G" means the maximum value of the ratio during impact. Procedures for measuring "G" and the "maximum value of G" are found in American Society for Testing and Materials (ASTM) Standard Test Method F 355-78, incorporated herein by reference. This procedure utilizes an instrumented missile that is allowed to fall freely from a specific height onto the resilient surface. Sensing components record electronically the deceleration-time history of the impact which is recorded on a device such as an oscilloscope. In particular, values of "G" and the "maximum value of G" as used in this patent application are determined by the use of procedure A of ASTM Standard Test Method F 355-78, which specifies the use of a cylindrical missile with a circular, flat, metal impacting surface. The missile has a mass of 9.072 kilograms (which normally weighs 20 pounds) and is dropped from a height of 0.6096 meters (which is equivalent to 24 inches).

The term "compression resistance" as used in this patent application means the ability of a polymeric pad to resist deflection under compressive load. Compression resistance can be measured by the parameter "25 percent compression deflection" which is a measure of the load necessary to produce a 25 percent deflection on a test specimen of the polymeric pad, for instance having an area of 650 mm$^2$ (1 inch$^2$) or 1,000 mm$^2$. For purposes of this invention "25 percent compression deflection" can be determined by the test procedure for compression deflection as stated in ASTM Standard Specification D 1667-76, incorporated herein by reference. Standard Specification D 1667-76 is stated to apply to flexible closed cell or noninterconnecting cellular products having an elastomer content which is predominantly polyvinyl chloride or copolymers of polyvinyl chloride. However for purposes of this invention the test methods of Standard Specification D 1667-76 are intended to apply to all polymeric pads of this invention regardless of composition.

BACKGROUND OF THE INVENTION

Artificial turf systems, for instance such as AstroTurf ™ recreational surfaces provided by Monsanto Company, generally comprise a grass-like mat of thermoplastic monofilament ribbons secured by weaving, tufting or knitting the ribbons to a backing. The ribbons are generally secured to the backing by a layer of adhesive applied to the backing on the side opposite the extended ribbons. For some purposes the turf may even have a thin layer foam backing to provide some cushioning for the turf when it is applied directly over a smooth hard surface such as asphalt, concrete, wood or earth. Such installations of turf directly over a smooth surface can be safely and effectively utilized for those activities where there is little likelihood of trauma-inducing bodily contact with the artificial turf. However for many other recreational activities, such as football, baseball, soccer, rugby and the like a shock-absorbing pad is generally located between the grass-like mat and the smooth hard surface to reduce the likelihood of bodily injury from falling or being thrown down onto the turf.

Shock-absorbing pads are usually made of foamed elastomer which provides good energy absorption at a reasonable cost. Such foamed elastomeric material may include polyvinyl chloride, polyethylene, polyurethane or combinations of these and other materials, for instance such as polyvinyl chloride-nitrile rubber or reconstituted rubber. Typical foamed material densities may range from 32 to 320 kilograms per meter square. Important criteria in selecting a shock-absorbing pad material include resistance to absorbing water, tensile strength and elongation, open cell versus close cell construction, resistance to chemical attack, low cost, availability in continuous lengths, softness in energy absorbing properties and compression set resistance.

An ideal shock-absorbing pad for recreational use where there is a potential for trauma should provide a reasonable softness for player comfort, for instance in normal shoe contact, combined with a high capacity for dissipation or distribution of kinetic energy involved in the impact of the player's fall. The design criteria is the ability to dissipate energy of motion by reducing the deceleration and through hysteresis losses in the material. A useful procedure for characterizing the required shock-absorbing properties is the American Society of Testing and Materials Standard F 355-78, a standard test method for shock-absorbing properties of playing surface systems and materials.

In general a body impacting a resilient pad is acted upon by deceleration forces which increase as the body penetrates into the surface of the resilient pad. These deceleration forces reach a maximum and then decrease as the body rebounds from the surface. The effectiveness of the shock-absorbing pad is indicated by the maximum deceleration encountered by the body. More appropriately the severity of the impact upon the body is the integrated profile of deceleration raised to the 2.5 power throughout the duration of the impact. The more effective shock-absorbing materials will exhibit broad and shallow deceleration profile; less effective shock-absorbing material exhibits sharply peaked deceleration profiles. In general thicker shock-absorbing pads offer better shock-absorbency. However in practice an excessively thick shock-absorbing pad may result in unsure footing and increased costs.

A body in impact experiences a comfort factor regardless of any trauma experienced. For instance a person who belly-flops on water, say from a one meter diving board, may experience severe discomfort such as stinging pain without experiencing any internal injuries. This results from the sudden time-rate of change of acceleration and is called a slap factor or jerk. The phenomena can also be demonstrated by slapping the body, for instance, the arm, with sections of various polymeric pad materials. A soft polymeric pad impacting the arm will not produce sting or slap; the pad also is not likely to be effective as a shock-absorber unless it is substantially thick so that an impacting body does not totally compress the pad. On the other hand a hard, or board like, polymeric pad impacting the arm is likely to produce considerable sting or slap; the pad is however likely to be effective as a shock-absorber provided that it is not too intractable. The slap factor can be quantified as the derivative with respect to time of acceleration. As such it can be graphically represented as the slope of the curve of "G" of an impacting body.

In general, shock-absorbing pads for use with artificial turf have comprised a single layer of foamed elastomeric material. See for instance U.S. Pat. No. 3,801,421 which discloses the use of a resilient pad comprising particulate vulcanized rubber bonded with polyisocyanurate resin. See also U.S. Pat. No. 3,661,687 which discloses an invention which attempts to provide a playing surface with a proper "feel" as well as provide shock-absorbing and shock-dissipating qualities. The patentee utilizes two layers of support material under artificial turf. The upper layer comprises a shock-dissipating material which is not bonded to but is required to lie separately on top of a lower layer of shock-absorbing material.

Since most layers of grass-like mat are sufficiently rigid to provide some shock-dissipation and generally lie upon a firm shock-absorbing material there is some need to provide an artificial turf system having a softer "feel."

By this invention applicant has provided such a shock-absorbing pad with a softer "feel" but yet which is firm under foot. The pad has a desirable soft upper section which reduces the slap impact. The pad also has a lower section having superior shock-absorbing properties. This pad is also not thick, is low cost and can be provided with advantageous shock-absorbing properties.

SUMMARY OF THE INVENTION

The present invention provides a unitary, shock-absorbing polymeric pad having a vertically asymmetric compression resistance. Preferred forms of the pad have an upper layer which exhibits 25 percent compression deflection at loads of less than 65 kilopascal or, in other cases, 45 kilopascal. The lower layer of such pads exhibit 25 percent compression deflection at high loads. Such pads also exhibit shock absorption such that the maximum value of G is in the range of 30 to 200, or in other cases less than 80.

This invention also provides improved structures utilizing such pads. In this regard the pads can be used for recreational surfaces, for instance substantially by themselves with a protective cover, such as a vinyl cover, for such purpose as wrestling or gymnastic mats. The pads are also advantageously useful as a component of recreational surfaces, such as artificial turf systems.

DESCRIPTION OF PREFERRED EMBODIMENTS

This invention provides a unitary shock-absorbing polymeric pad having a vertically-asymmetric compression resistance. In a preferred aspect of this invention the pad has an upper layer exhibiting a 25 percent compression deflection at a load of less than 45 kilopascal and a lower layer exhibiting a 25 percent compression deflection at a load of at least 1.3 times the load required for 25 percent compression deflection of said upper layer. Such a pad also exhibits shock absorption so that the maximum value of G, the ratio of acceleration of a missile during impact to the acceleration of gravity as determined by ASTM Standard Test Method F 355-78, is less than about 80.

In a preferred aspect of the pad of this invention, the lower layer exhibits a 25 percent compression deflection at a load in the range of 1.5 to 3.0 times the load required for 25 percent compression deflection of the upper layer.

Such pads of this invention desirably exhibit shock absorption such that the maximum value of G is less than about 80; in many cases it is advantageous that such pads exhibit a maximum value of G of less than about 70.

Such pads can vary in heights depending on the intended use. Advantageously, the thickness of such pads can range from as low as about 6 millimeters to as high as about 50 millimeters or more. However, in most cases it is desirable that the pad have a thickness in a range of 10 to 30 millimeters where the upper layer may have a thickness in the range of 3 to 12 millimeters.

Pads of this invention can be fabricated by bonding together, for instance by thermal bonding or chemical reaction, two or more discrete layers of polymeric material which will provide a pad exhibiting vertically-asymmetric compression resistance in discrete layers. In other instances it may be desirable to provide a pad with a generally uniformly progressive compression resistance. Such a pad can be provided, for instance by treatment of a pad of uniform composition from one surface such that a zone of the pad proximate the treatment has different properties than a zone of the pad distant from the treatment. Such treatment can comprise, for instance, radiation cross linking which may provide a more intractable zone at one surface and a more soft zone at an opposing surface with a gradual uniform progression of compression resistance across the pad.

Such pads can comprise a variety of polymeric materials which are often referred to as elastomer foams. Such materials include elastomer foams of polyethylene, polyvinyl chloride, polypropylene, reconstituted rubber, polyurethane and the like, including copolymers, such as the copolymer of polyvinyl chloride-nitrile rubber, and terpolymers.

In some instances the pads of this invention comprise the same polymeric material throughout the pad, that is in both the upper layer and the lower layer as well as in any intervening layers which may be present. In such pads, layers of the same material can be provided with different properties.

For instance a polyethylene pad according to this invention has been fabricated from two layers of polyethylene. The upper layer comprised polyethylene having a thickness of about 3/16 inch (about 4.8 mm) and a density of 2.8 pounds per cubic foot (about 45 kilograms per cubic meter) and a 25 percent compression deflection of 48 kilopascals. The lower layer comprised polyethylene having a thickness of about 7/16 inch (about 11.1 mm) and a density of 4.8 pounds per cubic foot (about 76.9 kilograms per cubic meter) and a 25 percent compression deflection of 103 kilopascals. The two layers were bonded together to produce a shock-absorbing pad having a density of 4.6 pounds per cubic foot (about 73.6 kilograms per cubic meter) and a 25 percent compression deflection of 83 kilopascals.

The two-layered pad was bonded to a top layer of artificial turf; the system comprising the pad and artificial turf exhibited a maximum value of G of 79.

In another case a pad was fabricated from two layers of a polyvinyl chloride-nitrile rubber copolymer. The upper layer was 0.35 inches (8.9 mm) thick and comprised a soft polymer which exhibited a maximum value of G of 230. The lower layer was also 0.35 inches (8.9 mm) thick and comprised a harder polymer which exhibited a maximum value of G of 135. The two layers were glued together to produce a pad 0.7 inches (17.8 mm) thick which exhibited a maximum value of G of 102.

In other cases it may be advantageous and desirable to fabricate a pad comprising different materials, for instance with an upper layer comprising a soft polyvinyl chloride foam and a lower layer comprising a harder polyethylene foam, and other such combinations.

In another aspect of the unitary shock-absorbing pad of this invention having a vertically-asymmetric compression resistance, the pad has an upper layer which exhibits a 25 percent compression deflection at a load of less than 63 kilopascal and a lower layer exhibiting a 25 percent compression deflection at a load of at least 7 kilopascal higher than the load required for the 25 percent compression deflection of the upper layer. In such pads the upper layer comprises polymer selected from the group consisting of a polyvinyl chloride, a polyvinyl chloride-nitrile rubber and a reconstituted rubber.

The lower layer of such pads can comprise the same polymers as the upper layer and in addition polyethylene or polypropylene. Pads made from these polymers can exhibit shock-absorption such that the maximum value of G is in the range of from 30 to 200. Preferably such pads exhibit shock-absorption such that the maximum value of G is less than 100, say about 80.

An advantageous use for the pads of this invention is in artificial turf assemblies. In this regard the scope of this invention is also intended to extend to artificial turf assemblies comprising a layer of artificial turf on top of to a unitary, shock-absorbing, polymeric pad having a vertically asymmetric compression resistance as described above. It is often advantageous that the artificial turf be bonded to the pad.

While the invention has been described herein with regard to certain specific embodiments, it is not so limited. It is to be understood that variations and modifications thereof can be made by those skilled in the art without departing from the spirit and scope of the invention.

What is claimed is:

1. A unitary, shock-absorbing polymeric pad having a vertically asymmetric compression resistance said pad having an upper layer exhibiting a 25 percent compression deflection at a load of less than 45 kilopascal and a lower layer exhibiting a 25 percent compression deflection at a load of at least 1.3 times the load required for 25 percent compression deflection of said upper layer, wherein said pad exhibits shock absorption such that the maximum value of G is less than about 80.

2. The pad of claim 1 wherein said lower layer exhibits a 25 percent compression deflection at a load in the range of 1.5 to 3.0 times the load required for 25 percent compression deflection of said upper layer.

3. The pad of claim 2 wherein said pad exhibits shock absorption such that the maximum value of G is less than 70.

4. The pad of claim 3 wherein said upper layer has a thickness from 3 millimeters to 12 millimeters.

5. The pad of claim 4 having an overall thickness of from 10 to 30 millimeters.

6. The pad of claim 1 wherein the vertical asymmetry of compression resistance is generally uniformly progressive from a lower surface of said pad to an upper surface of said pad.

7. The pad of claim 6 wherein a lower layer of less than about 50 percent of the pad thickness exhibits a 25 percent compression deflection at a load of at least two times the load required for 25 percent compression deflection of an upper layer of less than about 50 percent of the pad thickness.

8. The pad of claim 1 wherein the vertical asymmetry of compression resistance is stepwise progressive in more than two layers from a lower layer of said pad to an upper layer of said pad.

9. An artificial turf assembly comprising a layer of artificial turf on top of a unitary, shock-absorbing, polymeric pad having a vertically asymmetric compression resistance, said pad having an upper layer exhibiting a 25 percent compression deflection at a load of less than 45 kilopascal and a lower layer exhibiting a 25 percent compression deflection at a load of at least 1.3 times the load required for 25 percent compression deflection of said upper layer, wherein said pad exhibits shock absorption such that the maximum value of G is less than about 80.

10. A unitary shock-absorbing polymeric pad having a vertically asymmetric compression resistance wherein said pad has an upper layer exhibiting 25 percent compression deflection at a load of less than 65 kilopascal and a lower layer exhibiting a 25 percent compression deflection at a load of at least 7 kilopascal higher than the load required for the 25 percent compression deflection of the upper layer; wherein said pad exhibits shock absorption such that the maximum value of G is from 30 to 200, wherein said upper layer comprises a polymer selected from the group consisting of polyvinyl chloride, a polyvinyl chloride-nitrile rubber and a reconstituted rubber, and wherein said lower layer comprises a polymer which is the same as the top layer or polyethylene or polypropylene.

11. The pad of claim 10 wherein said pad exhibits shock absorption such that the maximum value of G is less than 80.

12. The pad of claim 11 wherein said pad has an overall thickness of from 10 to 30 millimeters.

13. The pad of claim 10 wherein the vertical asymmetry of compression resistance is generally uniformly progressive from a lower surface of said pad to an upper surface of said pad.

14. An artificial turf assembly comprising a layer of artificial turf bonded to a unitary, shock-absorbing, polymeric pad having a vertically asymmetric compression resistance, said pad having an upper layer exhibiting a 25 percent compression deflection at a load of less than 65 kilopascal and a lower layer exhibiting a 25 percent compression deflection at a load of at least 7 kilopascal higher than the load required for the 25 percent compression deflection of the upper layer; wherein said pad exhibits shock absorption such that the maximum value of G is from 30 to 200; wherein said upper layer comprises a polymer selected from the group consisting of polyvinyl chloride, a polyvinyl chloride-nitrile rubber and a reconstituted rubber; and wherein said lower layer comprises a polymer which is the same as the upper layer or polyethylene or polypropylene.

15. The artificial turf assembly of claim 14 exhibiting a maximum value of G of less than 100.

* * * * *